United States Patent [19]
Brickman

[11] 4,003,701
[45] Jan. 18, 1977

[54] GRAFT COPOLYMERIZATION PROCESSES
[75] Inventor: W. James Brickman, Philadelphia, Pa.
[73] Assignee: Scott Paper Company, Philadelphia, Pa.
[22] Filed: Feb. 2, 1971
[21] Appl. No.: 112,071
[52] U.S. Cl. .................... 8/115.6; 8/116 R; 8/128 R; 8/129; 8/DIG. 12; 8/DIG. 18; 204/159.12; 204/159.23; 260/17 A; 260/17.4 GC; 260/857 G; 264/25; 264/DIG. 46; 428/44
[51] Int. Cl.² .............. D06M 13/02; D06M 15/26; D06M 13/08
[58] Field of Search ............. 204/159.12, 159.23, 204/159.15; 117/93.1 DH, 93.31; 8/DIG. 18, DIG. 12, 115.6, 116 R, 129, 128 R; 264/25, DIG. 46; 260/17 A, 17.4 GC, 857 G

[56] References Cited
UNITED STATES PATENTS

| | | | |
|---|---|---|---|
| 3,340,326 | 9/1967 | Faessinger et al. | 260/857 G |
| 3,357,933 | 12/1967 | Faessinger et al. | 260/17.4 GC |
| 3,359,224 | 12/1967 | Faessinger et al. | 260/17 A |
| 3,505,257 | 4/1970 | Conte et al. | 260/17 A |
| 3,551,199 | 12/1970 | Forster | 117/93.1 DH |

FOREIGN PATENTS OR APPLICATIONS

| | | | |
|---|---|---|---|
| 1,920,592 | 11/1970 | Germany | 117/93.1 DH |
| 856,833 | 12/1960 | United Kingdom | 204/159.2 |

Primary Examiner—Wilbert J. Briggs, Sr.
Attorney, Agent, or Firm—Nicholas J. DeBenedictis; John W. Kane, Jr.

[57] ABSTRACT

A peroxidic-initiated graft copolymerization process wherein a water-insoluble thiocarbonated or thiocarbamated substrate is exposed to high-frequency microwave energy in the presence of at least one ethylenically unsaturated monomer and a perioxidic free radical initiator.

2 Claims, No Drawings

GRAFT COPOLYMERIZATION PROCESSES

BACKGROUND OF THE INVENTION

1. Field of the Invention

This invention relates to an improvement in a process for chemically modifying substrates to impart new properties thereto; and, more particularly, to an improved graft copolymerization process wherein a graft copolymer of such a substrate and at least one ethylenically unsaturated monomer can be obtained quite rapidly through the use of highfrequency microwave energy.

2. Description of the Prior Art

The process to which the improvement of this invention relates has been disclosed, for example, in a number of United States Patents, such as U.S. Pat. No. 3,340,326, U.S. Pat. No. 3,357,933, U.S. Pat. No. 3,359,222; and U.S. Pat. No. 3,359,224, said process being one in which a water-insoluble thiocarbonated or thiocarbamated substrate is reacted with at least one ethylenically unsaturated monomer via peroxidic free radical initiation. As indicated in each of the above-mentioned U.S. Patents, the copolymerization reaction can be conducted in either an aqueous or a non-aqueous system, but is preferably and ordinarily conducted in an aqueous system in which the monomer is uniformly distributed (cf., for example, column 9, lines 5 to 8 of U.S. Pat. No. 3,359,224). As also indicated in the above-mentioned U.S. patents (cf., for example, column 9, lines 16–41 of U.S. Pat. No. 3,359,224), the reaction conditions for this particular process are not narrowly critical, and depend to a large degree on the monomer or monomers employed and the monomer add-on desired. It should be noted, however, that when conventional batch grafting techniques are employed with mild reaction conditions (e.g. aqueous solutions, suspensions or emulsions of the monomer (s) with reaction temperatures at or about room temperature), extended periods of time are often required to obtain substantial add-ons of monomer, (cf., for example, the working examples of any of the above-mentioned patents).

SUMMARY OF THE INVENTION

The present invention resides in the use of high-frequency microwave energy in a process for graft-copolymerizing an ethylenically unsaturated compound and a water-insoluble thioated substrate in the presence of a free radical initiator, and the use of such microwave energy has been found to reduce considerably the amount of time necessary to obtain substantial add-ons of monomer in said process.

DESCRIPTION OF THE PREFERRED EMBODIMENTS

The peroxidic initiators, monomers and substrates employed in the improved process of this invention are any of those disclosed as being useful in the processes disclosed and claimed in the aforementioned U.S. Patents, the disclosures of which are incorporated herein by way of reference thereto.

As indicated supra, the substrate is a water-insoluble, thioated substrate, the term "thioated" in this instance meaning a thiocarbonated or thiocarbamated derivative which is obtained upon reacting the original substrate with either carbonyl sulfide or carbon disulfide, usually after the substrate has been wetted with an alkaline solution. The term "water-insoluble" means that the substrate, in the form in which it is employed, loses less than about 10 percent of its original weight in water at about 30° C. Illustrative of such substrates are mono- and/or dithiocarbonated derivatives of cellulosic materials (e.g. cotton, linen, rayon, hemp, sisal, wood, and the like), mono- and/or dithiocarbonated derivatives of amylaceous materials (e.g. amylose, amylopectin, potato starch, wheat starch, corn starch, rice starch, and tapicoa starch in their non-solubilized or unpasted forms) monothiocarbonated, dithiocarbonated, monothiocarbamated and/or dithiocarbamated derivatives of polyamides (e.g. synthetic linear polyamides prepared from polymerizable monoamino carboxylic acids, their amide-forming derivatives, from suitable diamines and suitable dicarboxylic acids, or from amide-forming derivatives of these compounds), monothiocarbonated, dithiocarbonated, monothiocarbamated and/or dithiocarbamated derivatives of keratinaceous materials (e.g. wool and other forms of hair, fur and animal protein, such as sheep wool, silk, cashmere, camel hair, alpaca, llama, vicuna, angora, squirrel, Chinese hog and badger hair, hides, leather, feathers, skins, regenerated animal protein, and the like), and mono- and/or dithiocarbonated derivatives of synthetic polymers containing hydroxyl groups or groups hydrolyzable to hydroxyl groups (e.g. polyvinyl alcohol, partially saponified polyvinylacetate, polyvinylacetate, copolymers of polyvinylalcohol, copolymers of vinylacetate, copolymers of polyvinylacetate, hydrolysis products of such copolymers, polymers and copolymers of hydroxyethylacrylate, polymers and copolymers of hydroxyethylmethacrylate, polymers and copolymers of hydroxypropylacrylate and hydroxypropylmethacrylate, ethers and esters of cellulose, and the like). Thus the term "thioated substrate" is intended to include any monothiocarbonated, dithiocarbonated, monothiocarbamated or dithiocarbamated derivatives of such substrates, as well as any corresponding derivatives produced by disproportionation or rearrangement during thiocarbonation or thiocarbamation. The water-insoluble, thioated substrates can be employed in any of their various forms, such as powders, particles, films, sheets, rods, beads, fibers, filaments, fabrics, threads, yarns, cords, knits, and the like.

The thiocarbonated or thiocarbamated substrates employed in the practice of the process of this invention can be prepared in accordance with any of the teachings of the aforementioned United States Patents. As taught in these patents, the substrate is prepared by initially wetting the non-thioated substrate with an alkaline solution, and then treating that alkaline-wetted substrate with carbon disulfide or carbonyl sulfide. As in the case of the thioated substrates employed in the processes disclosed and claimed in the aforementioned U.S. Patents, the strength of the alkaline solution used in each particular case will be dependent on the nature of the substrate and the desired degree of thiocarbonation or thiocarbamation, the only limit being that the strength of the alkali should be insufficient to dissolve to any appreciable degree the substrate being wetted. It has been found, for example, that wetting a cotton or nylon substrate with an aqueous alkaline solution containing from about one part by weight to about twelve parts by weight of an alkali such as sodium hydroxide per 100 parts by weight of the alkaline solution is usually sufficient to permit the substrate to be thioated to the degree necessary to enable it to be subsequently employed efficiently in the graftcopolymerization process to which this application relates. With a rayon substrate, wetting with an aqueous alkaline solution containing from about one part by weight to about three parts by weight of an alkali such as sodium hydroxide has been found to be sufficient; and with a starch substrate wetting with an aqueous alkaline solution containing from about 0.5 part by weight to about 1.5 parts by weight of an alkali such as sodium hydroxide has been found to be sufficient. With a wool or keratinaceous substrate, wetting with an aqueous solution of a milder alkali, such as an aqueous solution containing from about one part by weight to about four parts by weight of sodium silicate, has been found to be sufficient.

In addition to aqueous solutions of alkalies such as alkali metal hydroxides (e.g. lithium hydroxide, sodium hydroxide, potassium hydroxide, rubidium hydroxide and cesium hydroxide), aqueous solutions of other alkaline materials can also be employed to wet the substrate in order to enable it to be easily thioated, alkaline materials such as ammonium hydroxide, quaternary ammonium hydroxides (e.g., tetramethylammonium hydroxide, methyltriethylammonium hydroxide, trimethylbenzylammonium hydroxide and the like), quaternary phosphonium hydroxides (e.g., tetraethylphosphonium hydroxide, trimethylphenylphosphonium hydroxide, methyltriethylphosphonium hydroxide, trimethylisoamylphosphonium hydroxide, and the like), sulfonium hydroxides (e.g., triethylsulfonium hydroxide, methyldiethylsulfonium hydroxide, dimethylbenzylsulfonium hydroxide, methyldiethylsulfonium hydroxide and the like), quaternary arsonium hydroxides (e.g., trimethylphenylarsonium hydroxide, tetraethylarsonium hydroxide, methyltriphenylarsonium hydroxide and the like), and quaternary stibonium hydroxides (e.g. tetramethylstibonium hydroxide, tetraethylstibonium hydroxide, methyltriethylstibonium hydroxide and the like), as well as the slightly soluble alkaline earth metal hydroxides such as calcium hydroxide, strontium hydroxide, barium hydroxide and the like).

In addition to the strong and relatively strong bases mentioned above, basic salts, and water soluble organic amines serve equally well. Such basic salts, or mixtures of these salts as sodium carbonate, trisodium phosphate, disodium hydrogen phosphate, disodium ammonium phosphate, sodium silicate, sodium aluminate, sodium antimoniate, sodium stannate, sodium cynaide, sodium cyanate, sodium sulfide, potassium carbonate, tripotassium phosphate, dipotassium phosphate, potassium silicate, potassium aluminate, potassium antimoniate, potassium stannate, potassium cyanide, potassium cyanate, potassium sulfide, lithium carbonate, trilithium phosphate, dilithium hydrogen phosphate, lithium silicate, and the like, as well as such water-soluble amines as methylamine, ethylamine, dimethylamine, pyridine, and such quaternary ammonium hydroxides as tetramethylammonium hydroxide and benzyltrimethylammonium hydroxide are just a few examples of basic materials which have served equally well in the preparation of the various water-insoluble thiocarbonates. In fact, a basic salt whose aqueous solution has a pH of about 8 or 9 or greater may be suitable. It should be recognized, also, that a mixture consisting of a basic salt and an inorganic or organic hydroxide is included in this group. However, those basic salts which are known to chemically modify the substrate and which would thereby interfere with the thiocarbonation process are to be avoided when practicing this invention.

Thiocarbonation and/or thiocarbamation can be accomplished by bringing the alkaline-wet substrate into intimate contact with carbon disulfide or carbonyl sulfide. Either vaporous carbon disulfide or carbonyl sulfide or a solution of the sulfide in any inert solvent or an aqueous emulsion of the sulfide in an inert water immiscible organic solvent may be used. The thiocarbonation and/or thiocarbamation reaction is conducted as long as is necessary to acquire the desired degree of thiocarbonation. Usually merely exposing the alkaline substrate to the carbonyl sulfide or carbon disulfide suffices.

Thiocarbonation or thiocarbamation is of a relatively low order, i.e., substrates are produced having thioate sulfur contents of the order of about 0.5 percent to about 4.0 percent, and are usually 2.5 percent or less. This low thiocarbonation or thiocarbamation is, of course, vital when it is possible to produce a water-soluble thioated substrate, e.g., from cellulose or starch. The techniques known in the art can be used to produce water-insoluble thioated substrates, e.g., using carbon disulfide in the presence of alkali to produce a dithiocarbonated and/or dithiocarbamated substrate and carbonyl sulfide in the presence of alkali to produce a monothiocarbonated and/or monothiocarbamated substrate. With alkali-wetted cotton substrates, treating the substrate with from about five parts by weight to about nine parts by weight of carbon disulfide or carbonyl sulfide per 100 parts by weight of the thioating solution has been found to be sufficient to provide a substrate which graft copolymerizes efficiently in the process of this invention. With alkali-wetted rayon substrates, from about one part by weight to about three parts by weight of carbonyl sulfide or carbon disulfide have been found to be sufficient; and with an alkali-wetted nylon substrate, from about eight parts by weight to about twelve parts by weight of carbonyl sulfide or carbon disulfide have been found to be sufficient. With alkali-wetted keratinaceous substrates such as wool, concentrations of carbon disulfide or carbonyl sulfide in the range of from about one part by weight to about four parts by weight are usually sufficient; and with alkali-wetted starch substrates, less carbon disulfide or carbonyl sulfide is usually employed, with from 0.5 part by weight to about 1.5 parts by weight having been found to be sufficient for most purposes.

A wide variety of thiocarbonate and/or thiocarbamate salts can be produced by reacting, by metathesis, an ammonium, organic ammonium, phosphonium, sulfonium, arsonium, stibonium salt or an alkali metal salt such as lithium, sodium, potassium, etc. of the thiocarbonate and/or thiocarbamate of the substrate with a water-soluble salt of a metal or mixture of metals from Group Ib of the Periodic Table such as Cu, Ag, and Au; Groups IIa and IIb such as Mg, Ca, Sr, Zn, Cd, etc.; Groups IIIa and IIIb such as Sc, Y, La, Al, Ga, etc. Group IVb such as Ti, Zr, etc., as well as Ge, Sn and Pb; Group Vb such as V, Nb, etc.; as well as Bi; Group VIb such as Cr, W, etc.; Group VIIB such as Mn, etc.; and Group VIII such as Fe, Co, Ni, Os, etc., to yield a new thiocarbonate and/or thiocarbamate derivative of the metal.

In general, the previously described alkali metal salts of the thiocarbonate and/or thiocarbamate are used if copolymerization is to be carried out without undue delay. At times, however, it is advantageous to effect a conversion of at least part of the alkali metal thiocarbonate and/or thiocarbamate salt to a salt which is more stable, or which is a more reactive intermediate. For example, an aluminum thiocarbonate salt of the substrate can be prepared by passing an aluminum sulfate or aluminum acetate solution through, about, or over an alkali metal thiocarbonate of the substrate. The zinc thiocarbonate of the substrate can be prepared from zinc chloride or some other soluble zinc salt, zirconyl thiocarbonate from zirconium oxychloride, uranyl thiocarbonate from uranyl acetate, lead thiocarbonate from lead acetate, and ferrous thiocarbonate from ferrous ammonium sulfate or ferrous chloride, etc. This technique is especially useful when a soluble hydroxide or basic salt of the desired cation is non-existent or unavilable.

The thioated substrate, when graft polymerized with the monomer, should be substantially free from any water-soluble by-products of the thioate formation or thioate substrate decomposition, i.e., decomposition of thioate groups, which are known in the art to be labile. Thus, after its formation the thioated substrate, in the form of an alkali metal salt, alkaline earth metal salt, or an ammonium salt, or the previously described converted metal salts, is washed with water to remove water-soluble reaction by-products and free metal ions, preferably immediately prior to its suspension in an emulsion or solution of the polymerizable ethylenically unsaturated monomer to ensure no further formation of byproducts prior to polymerization.

Illustrative of the types of ethylenically unsaturated compounds which can be employed in the graft-copolymerization process of this invention are any of the compounds which readily homopolymerize or readily copolymerize with other ethylenically unsaturated compounds either in bulk, or in an aqueous solution, or as an emulsion, when exposed to a redox system capable of initiating a polymerization or copolymerization. By the term monomer is meant an ethylenically unsaturted compound having the structure

which encompasses vinylene monomers of the general form RHC=CHR and vinylidene monomers of the general form H$_2$C=CR$_2$ and including the monomers on which all four of the open valence bonds are occupied by R substituents as well as those in which at least two R substituents, one on each carbon atom, form a ring derivative.

The radical R is selected from at least one member of the electron-accepting groups and electron-donating groups consisting of:

1. Hydrogen;
2. Alkyl groups, alkenyl groups and alkynyl groups, both substituted and unsubstituted, in which the hydrocarbon moiety contains up to about six carbon atoms such as methyl, ethyl, butyl, amyl, hexyl, ethenyl, hydroxymethyl, chloromethyl, and the like;
3. Aryl groups, including substituted aryl groups such as phenyl, alpha-chlorotolyl, tolyl, 4-chlorophenyl, alphatolyl, xylyl, 2-bromo-4-ethylphenyl, and the like;
4. Electronegative groups, for example, chloro, bromo, cyano, and the like;
5. Alicyclic groups and heterocyclic groups, both substituted and unsubstituted, such as pyridyl, thienyl, furyl, pyrrolidyl, and the like;
6. Groups of the general formula

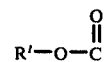

wherein R$'$ is selected from the group consisting of hydrogen, substituted hydrocarbons containing from 1 to 18 carbon atoms, and unsubstituted hydrocarbons containing from 1 to 18 carbon atoms, such as methyl, ethyl, butyl, amyl, hexyl, heptyl, octadecyl, nitroethyl, nitrobutyl, N,N-dimethylaminoethyl, t-butylaminoethyl, 2-cyanoethyl, cyclohexyl, N,N-diethylaminoethyl, hydroxyethyl, hydroxypropyl, and the like;

7. Groups of the general formula

8. Groups of the general formula

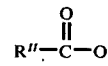

9. Groups of the general formula

10. Groups of the general formula

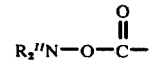

and wherein R$''$ is selected from at least one member of the group consisting of hydrogen, aliphatic hydrocarbon groups of from 1 to 18 carbon atoms and in addition the substituted as well as the unsubstituted hydrocarbon groups containing from 1 to 18 carbon atoms such as the methyl, ethyl, propyl, butyl, amyl, hexyl, hepty, octadecyl, chloroethyl, chloromethyl, hydroxyethyl, hydropropyl epoxyethyl, phenyl, p-chlorophenyl, and the like.

At least one of the members of the following group of ethylenically unsaturated monomers which readily homopolymerize or readily copolymerize with other ethylenically unsaturated compounds either in bulk, or in an aqueous solution, or as an emulsion may be used: ethylenically unsaturated aromatic compounds and mono-di-, tri, tetra- and penta-substituted aromatic compounds, wherein the ring is substituted with at least one member selected from the class consisting of alkyl groups (substituted and unsubstituted) having from 1 to 7 carbon atoms and/or with inorganic electron-accepting and/or inorganic donating groups such as halogen, nitro, sulfano, etc., and wherein the ethylenically unsaturated moiety has from 2 to 5 carbon atoms, either substituted or unsubstituted, such as alpha-methylstyrene, p-chloromethylstyrene, o-methylstyrene, m-methylstyrene, 2,4-dimethylstyrene, 2,5-dimethylstyrene, 2,4,5-trimethylstyrene, p-ethylstyrene, o-bromostyrene, 2-bromo-4-ethylstyrene, p-isopropylstyrene, p-chlorostyrene, 2,4-dichlorostyrene, p-bromostyrene, o-chlorostyrene, m-chlorostyrene, beta-chlorostyrene, 2,5-dichlorostyrene, 4-ethyoxystyrene, p-isopropylalpha-methylstyrene, betanitrostyrene, p- nitrostyrene, and the like; also polymerizable alkylacrylic acids having from 1 to 5 carbon atoms in the alkyl chain provided, in all instances, when there is no alkyl chain, the substituent is hydrogen or some other speicifed moiety, such as halogens, cyano, etc., e.g. acrylic acid, methacrylic acid, alphachloroacrylic acid, 2-furfurylacrylic acid, and the like; alkylacrylic acid esters having from 1 to 5 carbon atoms in the alkyl chain provided, in all instances, when there is no alkyl chain, the substituent is hydrogen or some other speicifed moiety, such as halogen, cyano, etc., and wherein the esters are formed from the monohydric alcohols (substituted and unsubstituted) selected from the group consisting of alkyl alcohols having from 1 to 20 carbon atoms such as amyl acrylate, amyl methacrylate, benzyl methacrylate, benzyl acrylate, glycidyl methacrylate, butyl acrylate, butyl methacrylate, dodecyl acrylate, cyclohexyl acrylate, cyclopentyl methacrylate, ethyl acrylate, methyl-alphabromoacrylate, methyl-alphachloroacrylate, ethyl methacrylate, 2-ethylhexyl acrylate, heptyl acrylate, ethyl-alpha-bromoacrylate, hexyl methacrylate, lauryl methylacrylate, methyl acrylate, methyl methacrylate, stearyl acrylate, stearyl methacrylate, propyl acrylate, 2-bromoethyl acrylate, 2-chloroethoxyethyl methacrylate, etc.; the substituted amino alcohols having from 2 to 7 carbon atoms in the alkyl chain and from 1 to 7 carbon atoms in the alkyl chains on the amino moiety such as N,N-dimethylaminoethyl acrylate, N-t-butylaminoethyl methacrylate, N,N-diethylaminoethyl acrylate, 2-N-morpholinoethyl methacrylate, and the like; nitro alchohols wherein the alkyl chain has from 2 to 7 carbon atoms such as 3-nitro-2-butanol, 2-nitro-3-hexanol, 2-methyl-2-nitro-1-butanol, 2-nitro-2-methyl propanol, etc.; cyanoalkyl alcohols wherein the alkyl chain has from 2 to 7 carbon atoms such as 2-cyanoethyl acrylate, and the like; unsaturated polymerizable alkylacrylic acid amides having from 1 to 5 carbon atoms in the alkyl chain provided, in all instances, when there is no alkyl chain, the substituent is hydrogen or some other speicifed moiety described above, and also wherein the amide is formed from ammonia, primary and secondary amine or a diamine having from 1 to 16 carbon atoms (subsituted and unsubstituted) such as acrylamide, methacrylamide, ethacrylamide, methylene-bisacrylamide, t-butylacrylamide, 2-cyanoacrylamide, N-(p-chlorophenyl) methacrylamide, N,N-diallylacrylamide, N,N-dimethylacrylamide, hexamethylene-bis-acrylamide, N-alphanaphthylacrylamide, etc.; or the ethylenically unsaturated nitriles such as acrylontrile, methacrylonitrile, ethacrylonitrile, alpha-chloroacrylonitrile and the like; polymerizable alkylene glycol and polyhydric glycol alkylacrylates and dialkylacrylates having 1 to 5 carbon atoms in the alkyl chain provided, in all instances, when there is no alkyl chain, the substituent is hydrogen or some other speicifed moiety described above, such as ethylene glycol dimethacrylate, triethylene glycol dimethacrylate, polyethylene glycol dimethacrylate, tetramethylene dimethacrylate, glyceryl triacrylate, hydroxyethyl methacrylate, hydroxypropyl methacrylate and the like; fatty acid esters of 1-olefins (substituted and unsubstituted) containing from 2 to 24 carbon atoms but preferably from 2 to 18 atoms wherein the 1-olefin alcohol precursor of the fatty acid esters has from 2 to 8 carbon atoms but preferably 2 to 3 carbon atoms, such as, vinyl acetate, vinyl propionate, vinyl butyrate, isopropenylacetate, vinyl-n-hexanoate, vinylchloroacetate, vinylcrotonate, vinyl-n-decanoate, vinyl-formate, vinyl-2-ethyl hexoate, vinyl laurate, vinyl oleate, vinyl stearate, vinyl trifluoroacetate, allyl linolate, allyl oleate, allyl acetate, allyl propionate, allyl chloroacetate, allyl caproate, allyl butyrate, etc; aromatic acid esters (substituted and unsubstituted) of unsaturated alcohols wherein the alcohol precursor has from 2 to 8 carbon atoms but preferably from 2 to 3 carbon atoms such as allyl benzoate, diallyl phthalate vinyl phthalate, vinyl benzoate, etc.; ethylenically unsaturated aliphatic diacids containing from 4 to 10 carbon atoms but preferably from 4 to 6 carbon atoms, and their esters, nitriles and amides such as, itaconic acid, maleic acid, fumaric acid, dimethyl maleate, dibutyl maleic, dimethyl fumarate, dibutyl fumarate maleic anhydride, diethyl fumarate, etc.; polymerizable aliphatic dienes such as butadine, 2,3-dimethyl butadiene, isopropene, pentadiene, etc.; and the haloprenes such as chloroprene and the like; 1-olefins (substituted and unsubstituted) containing from 2 to 18 carbon atoms but preferably from 2 to 8 carbon atoms such as vinyl chloride, vinylidene chloride, allylamine, diallylamine, diallylphosphate, allyl chloride, nitroethylene, butadiene monoxide, vinyl acrylate and the like; the vinyl esters (substituted and unsubstituted) such as vinylethyl ether, vinylpropyl ether, vinylisobutyl ether, vinyl-2-methoxyethyl ether, vinyl-n-butyl ether, vinyl 2-chloroethyl ether, vinyl-2-ethylhexyl ether, and the like; or other vinyl compounds such as divinylsulfone, divinylsulfide, divinylbenzene, etc; ethylenically unsaturated heterocyclic compounds wherein the heterocycle contains from 3 to 5 carbon atoms and the hetero atoms are selected from the group consisting of N, O and S such as the vinyl pyridines, N-vinyl pyrrolidone, vinyl furan, alpha vinyl thiophene and the like. In general, the only requirement necessary in order for a monomer to be useful in this invention is that it has at least one olefinic double bond which readily homopolymerizes or readily copolymerizes with other ethylenically unsaturated compounds either in bulk, or in an aqueous solution, or as an emulsion.

More specifically, at least one member of the following group of polymerizable or copolymerizable monomers is useful; styrene, p-chloromethyl styrene, sodium p-styrenesulfonate, vinyl toluene, 2,5-dichlorostyrene, alpha-methyl styrene, acrylamide, acrylic acid, acrylonitrile, N-t-butyl acrylamide, methacrylamide, N,N-methylene-bis-acrylamide, N,N-diethylacrylamide, methacrylic acid, t-butyl-aminoethyl methacrylate, N,N-diethylaminoethyl acrylate, N,N-diethylaminoethyl methacrylate, N,N-dimethylaminoethyl acrylate, 2-cyanoethyl acrylate, n-butyl acrylate, n-butyl methacrylate, decyl acrylate, decyl methacrylate, ethyl acrylate, 2-ethylhexyl acrylate, ethyl methacrylate, glycidyl acrylate, glycidyl methacrylate, n-hexyl methacrylate, n-lauryl methacrylate, methyl acrylate, methyl methacrylate, stearyl methacrylate, ethylene glycol dimethacrylate, triethylene glycol dimethacrylate, tetraethylene glycol dimethacrylate, polyethylene glycol dimethacrylate, hydroxypropyl methacrylate, hydroxyethyl methacrylate, diallyl adiapte, diallyl maleate, N,N-diallyl melamine, diallyl phthalate, diallyl phosphite, diallyl phosphate, diallyl fumarate, vinyl chloride, vinylidene chloride, maleic acid, itaconic acid, fumaric acid, di-n-butyl fumarate, di-n-butyl maleate, di-n-butyl itaconate, diethyl maleate, methyl vinyl ketone, 2-methyl-5-vinylpyridine, N-vinyl carbazole, 2-vinyl pyridine, 1-vinyl-2-pyrrolidone, N-vinyl pyrrolidene, vinyl-n-butyl ether, vinyl-isobutyl ether, vinyl-2-chloroethyl ether, vinyl ethyl ether, vinyl-2-ethylhexyl ether, vinyl triethoxysilane, vinyl stearate, vinyl butyrate, vinyl acetate, vinyl-2-ethylhexoate, vinyl propionate, divinyl benzene and divinyl sulfone.

As indicated supra, the graft-copolymerization process of this invention involves the use of high-frequency micro-wave energy to substantially accelerate the graft-copolymerization of the ethylencially unsaturated monomer or monomers with the thioated substrate. Since the reaction times necessary to obtain relatively high add-on of monomer to substrate have been substantially reduced through the use of high frequency micro-wave energy, the process of this invention now lends itself to an efficient continuous method for graft-copolymerization, through the use of any one of a number of micro-wave heating devices which are presently available commercially. Without wishing to be bound to any particular theory as to why the use of high-frequency micro-wave energy substantially accelerates the graft-copolymerization reaction, it is believed that the micro-wave energy converts the thioated substrate, the monomer and/or the peroxidic initiator to highly excited states while these materials are in intimate contact with one another Micro-waves having wavelengths of from about 0.3 cm to about 33 cm and a frequency greater than about 900 MegaHertz can be employed.

As indicated in the aforementioned U.S. Patents, the remaining polymerization conditions are not narrowly critical, and depend primarily on the chemical properties of the monomer or monomers employed, and on the properties desired in the final grafted product. The selected thioated substrate can be used in any proportion to the monomer, e.g., from about 0.5 percent by weight to 99.9 percent by weight, based on the total weight of the substrate and th ethylencially unsaturated monomer. Similarly the monomer can also be employed in almost any concentration, e.g. from about 1 percent to about 100 percent of the total monomer solution or suspension; and the reaction mixture can be buffered, if necessary, or its pH adjusted to provide the best polymerization conditions for the selected monomer or monomers.

As with the products of the process disclosed and claimed in the afornentioned earlier U.S. Patents, the products of the process to which the present invention relates exhibit a wide range of properties, depending primarily on the initial physical properties of the substrate which is employed, and on the particular monomer or monomers which are grafted to the substrate by way of the process of this invention. In the case of derivatives of fibrous cellulosic materials, products having exceptional dimensional stability, enhanced dyeability, water-repellency, improved electrical properties or improved resistance to bacterial degradation can be obtained. In the case of derivatives of non-fibrous cellulosic derivatives and non-fibrous derivatives of synthetic hydroxyl groups containing polymers, such as derivatives of starches and polyvinyl alcohols, adhesives with improved bonding capabilities, improved sizing agents, and hydrophobic dusting or molding powders can be obtained. In the case of derivatives of nylon materials, products having improved electrical properties, improved moisture retention, or improved soil resistance can be obtained; and, in the case of derivatives of keratinateous materials such as wool, products exhibiting improved elastic and/or felting properties, improved dimensional stability and abrasion resistance, improved insect-resistance, and greater fiber lubricity can be obtained. In addition, since a number of monomers which are capable of being grafted to the various substrates by way of the process of this invention can contain surface-active groups, the resulting grafted products can have ion-exchange characteristics which make these products particularly attractive in applications such as catamenial and hemostatic devices, metal ion scavengers, and the like. By now it should be apparent that to one knowledgeabile in the properties of synthetic polymers and copolymers, there are innumerable combinations of monomers and substrates which will readily suggest themselves as having useful and novel properties when the particular monomers are grafted to the appropriate substrate in accordance with the process of this invention.

In addition to the numerous modified products which can be obtained quite rapidly by way of the process of this invention, it has also been found, due to the rapidity with which the graft-copolymerization process can be effected through the use of microwave energy, that the process lends itself to the simultaneous printing and grafting of a number of fibrous substrates, in order to rapidly obtain printed substrates which exhibit good wash-fastness, even in warm, soapy water. In the preferred embodiment of this aspect of the present invention, the substrate to be printed is first thioated in the normal manner, and then is printed with a printing paste comprising the appropriate dyestuff, along with a monomer or monomers and the peroxidic free-radical initiator. The printed thioated substrate is then exposed to the microwave energy to simultaneously print and graft the substrate and obtain the resulting printed product.

In order to describe the present invention so that it may be more clearly understood, the following examples are set forth in which all parts and percentages are expressed in parts or percentages by weight unless otherwise stated. These examples are set forth primarily for the purpose of illustration, and any specific enumeration of detail contained therein should not be interpreted as a limitation on the concept of this invention.

EXAMPLES 1 and 2

Three pieces of cotton LaCoste knits were cut to a size which would conveniently fit into a 6 inch × 12 inch bag of 0.006 inch thick polyethylene and each of these samples was placed in a 500 ml. stainless steel launderometer bottle containing one three-quarter inch and ten one-quareter inch diameter stainless steel balls. Each of the stainless steel launderometer bottles containing the cotton samples was then filled with a freshly prepared aqueous thiocarbonation liquor which comprised 1.6% by weight of sodium hydroxide, 1.14% by weight of carbon disulfide and 0.5% by weight of a non-ionic surfactant manufactured by Rohm and Haas Company of Philadelphia, Pennsylvania and sold under the Trademark of "Triton X-155." Each of the stainless steel bottles was then capped and rotated end-over-end at 42 revolutions per minute in a constant temperature oven maintained at 25° C for a 20 minute period, after which period of time the bottles were opened and the samples removed. Each of the samples was squeezed free of any excess thiocarbonation liquor and immediately immersed in water to dilute the reactants and arrest the thiocarbonation of the samples. The thiocarbonated samples were squeezed free of any excess solution from the aqueous quenching step, and then each of the samples was washed in three consecutive identical washings each of which consisted of placing the sample in a one-liter, widemouth, screw-cap polyethylene bottle filled with water having a pH of 6.0 and a temperature of 50° C., then capping the bottle and mechanically agitating the bottle on a shaker at 120 cycles per minute for two minutes for each washing.

After the last of the three washings, each of the samples was squeezed free of any excess wash water and then centrifuged for four minutes at 4,000 rpm in a centrifuge to further remove any remaining wash water. Each of the centrifuged samples was then place in separate one-liter, widemouth, screw-cap, polyethylene bottles, each of which contained 500 ml of an aqueous solution which comprised 0.004% by weight of the 500 ml solution of ferrous ammonium sulfate hexahydrate (Mohr's Salt) and 0.05% by weight of the 500 ml solution of tetrakis-hydroxymethylphosphonium chloride. After capping, each of the bottles was mechanically agitated at 120 cycles per minute for five minutes at 25° to 30° C, after which time the samples were removed from the bottles and any excess liquid was squeezed out by hand. Each of the samples was then washed in four consecutive identical washings, each of which consisted of placing the sample in a one-liter, widemouth, screw-cap, polyethylene bottle filled with water having a pH of 6.0 and a temperature of 50° C, then capping the bottle and mechanically agitating the bottle at 120 cycles per minute for two minutes for each washing.

After the last of the four washings, each of the samples was placed smoothly into a separate 6 inch by 12 inch bag of 0.006 inch thick polyethylene and a monomer catalyst-mixture which comprised an aqueous mixture of acrylamide and hydrogen peroxide was then introduced into the bags containing the metathesized thiocarbonated samples. In the case of the first sample, which was designed to be the control (i.e. the sample to which no microwave energy is applied) the monomer-catalyst mixture consisted of 5.28 grams of acrylamide and 0.015 gram of hydrogen peroxide in twenty grams of water. In the case of the remaining two samples, the monomer-catalyst mixture consisted of 4.93 grams of acrylamide and 0.015 gram of hydrogen peroxide in 20 grams of water. The bottom edge of each of the bags containing the separate samples and monomer-catalyst mixtures was inserted into the nip of a hand-operated home laundry clothes wringer and then slowly passed through the wringer to pad-on and impregnate the sample with the monomer-catalyst mixture contained in the bag. Air and excess monomer-catalyst mixture were forced out the top of the bags, and the bags, after passing through the wringer were folded over at the top and sealed, in order to retain the monomer-catalyst mixtures in intimate contact with the samples, while excluding, as much as practically possible, any air or other external gases from re-entering the bags prior to the completion of the grafting reaction. The bag containing the first sample was placed in a circulating air oven at 110° C for 600 seconds, whereas the remaining two samples were placed in the cavity of a microwave oven having an energy field of 1 Kilowatt at 2,450 Megahertz. One of the samples was exposed to the microwave energy for an 18 second period, and the other sample was exposed to the microwave energy for only a three second period. Each of the samples, including the control which was placed in the circulating air oven, was removed from its polyethylene bag and immersed in a dilute sodium bisulfite solution to destroy any remaining peroxide, thereby terminating the grafting reaction. The samples were then extracted with hot water, dried and then weighed to determine the add-on attributable to the grafting reaction. In the case of the control sample which originally weighed 6.68 grams and which was merely heated in the circulating hot air oven, the sample exhibited an add-on of 18.0%. In the case of the sample which was exposed to the microwave energy for an 18 second period and which originally weighed 5.52 grams, the add-on, after extraction, was 52.8%; and, in the case of the sample which was exposed to the microwave energy for 3 seconds and which originally weighed 5.53 grams, the add-on, after extraction, was 25.1%.

EXAMPLE 3

Four six-inch diameter disks of cotton LaCoste knit fabric, the combined weights of which did not exceed 10 grams, were stacked on top of a piece of Whatman No. 31 filter paper in a Büchner funnel and then saturated with 50 grams of an aqueous thiocarbonation liquor having a temperature of 25° C and comprising 10% by weight of sodium hydroxide, 10% by weight of carbon disulfide and 0.44% by weight of "Triton X-155." Saturation was accomplished by maintaining a slight positive pressure of air against the underside of the funnel for a one minute period, thereby retarding premature drainage of the thiocarbonation liquor through the cotton disks and the funnel itself. Vacuum was then applied to remove the thiocarbonation liquor from the funnel. The stack of cotton disks was then inverted in the funnel, and the same procedure was repeated on the inverted stack with another 50 gram portion of thiocarbonation liquor. After removal by vacuum of the remainder of this second portion thiocarbonation liquor, the stack of disks was immediately washed while the system was still under reduced pressure with 500 ml. of water which had previously been adjusted to a pH of 4.0 with formic acid and which was at a temperature of 50° C. Complete drainage occurred within 30 seconds. The stack of disks was then inverted, and a second 500 ml., wash identical to the first, was applied in the same manner as with the first, as was a third, fourth and fifth wash, with the stack of disks being inverted or reinverted between each of these subsequent washes. After completion of these washings, the stack of disks was then covered with a 125 ml. portion of an aqueous solution having a temperature of 25° C and containing 0.004% by weight, based on the total weight of the aqueous solution of Mohr's Salt and 0.05% by weight, based on the total weight of the aqueous solution of tetrakis-hydroxymethylphosphonium chloride. Drainage was controlled to 125 ml. per minute and the excess metathesizing liquor was removed with a minimum of suction. The stack of disks was then inverted and this same procedure was repeated with another 125 ml. portion of metathesizing liquor. The stack of disks was then washed with three 200 ml. portions of 25° C water having a pH of 4.0 in a manner similar to that set forth above with respect to the washing procedure which followed the thiocarbonation of the samples. One of the disks, which originally weighed 2.36 grams, was placed in a polyethylene bag similar to those employed in Examples 1 and 2, along with a monomer-catalyst mixture which consisted of 8.2 grams of acrylamide, 11.55 grams of N-methylolacrylamide, 5.0 grams of water and 0.1875 gram of $H_2O_2$.

This particular sample was then graft-copolymerized in a manner similar to that set forth above for Examples 1 and 2. After a 90-second exposure to microwave energy the unextracted add-on exhibited by the grafted product was 107%.

EXAMPLES 4, 5 and 6

Three samples of cotton muslin were thiocarbonated, washed, metathesized and washed again in the same manner as the LaCoste knit fabrics employed in Examples 1 and 2. The samples were then graft-copolymerized in the same manner as that disclosed in Examples 1 and 2 above, using a different monomer-catalyst for each of the samples. Each of the samples was exposed to the microwave energy for a 60 second period. The initial weights of the samples, the compositions of various monomer-catalyst systems, the final weights of the products obtained, and the percentage add-on (unextracted) for each of the samples are set forth in the following tables:

TABLE I

| Monomer-Catalyst Components | Example 4 | Example 5 | Example 6 |
| --- | --- | --- | --- |
| Water | 37.5 grams | 37.5 grams | 37.5 grams |
| Ethyl Acrylate | 60 grams | | |
| Acrylic Acid | | 60 grams | 30 grams |
| N,N-dimethylamino-ethylMethacrylate | | | 30 grams |
| Atlas HLB No. 4* | 1.0 gram | 1.0 gram | 1.0 gram |
| TRITON GR-5** | 1.5 grams | 1.5 grams | 1.5 grams |
| 6.25% aqueous solution of $H_2O_2$ | 2.0 cc. | 2.0 cc. | 2.0 cc. |

*HLB No. 4 is a non-ionic surfactant manufactured and sold by Atlas Chemical Industries of Wilmington, Delaware.
**TRITON GR-5 is an anionic surfactant manufactured and sold by Rohm & Haas Company of Philadelphia, Pennsylvania.

TABLE II

| | Example 4 | Example 5 | Example 6 |
| --- | --- | --- | --- |
| Initial Weight of Sample | 4.80 grams | 4.79 grams | 4.83 grams |
| Weight of the Resulting Product | 5.47 grams | 6.96 grams | 6.52 grams |
| % Add-on (Unextracted) | 14.1 | 45.3 | 35.0 |

EXAMPLES 7, 8 and 9

Three samples of cotton muslin substrate were separately thiocarbonated as in Example 3. The excess thiocarbonation liquor was squeezed from each of the samples by hand, and then each of the samples was immersed in separate one-liter, widemouth, screw-cap polyethylene bottles filled with 50° C water which has been adjusted to a pH of 4.0 with formic acid. The capped one-liter bottles were then agitated at 120 cycles per minute on a mechanical shaker for two minutes. Excess water was removed from each of the substrates by hand squeezing, this same wash procedure was repeated with each of the samples three additional times. Each of the samples was then metathesized in the same manner as that employed with the sample of Example 3, and then each of the samples was washed with 3 one-liter portions of 25° C water having a pH between 6 and 7, using the technique employed above with the washing after thiocarbonation of the samples. The samples were then separately grafted in a manner similar to that employed in Examples 1 and 2 above.

TABLE III

| Monomer-Catalyst Components | Example 7 | Example 8 | Example 9 |
| --- | --- | --- | --- |
| Water | | | 18.0 grams |
| Methyl Methacrylate | 15 grams | 15 grams | |
| Ethyl Acetate | 10 grams | | |
| Ethanol | | 5 grams | |
| Atlas HLB NO. 4 | | | 0.5 gram |
| TRITON GR-5 | | | 1.5 grams |
| $H_2O_2$ | 0.1875 gram | 0.1875 gram | |
| Benzoyl Peroxide | | | 0.1 gram |

TABLE IV

| | Example 7 | Example 8 | Example 9 |
| --- | --- | --- | --- |
| Initial Weight of Sample | 5.14 grams | 5.02 grams | 5.24 grams |
| Weight of the Resulting Product | 5.66 grams | 5.53 grams | 6.01 grams |
| % Add-on | 10.1 | 10.1 | 14.8 |

EXAMPLE 10

Five approximately equal size pieces of cotton muslin were inserted in a 5-ply relationship in a polyethylene bag similar to those employed in Examples 1 and 2. The polyethylene bag contained an aqueous thiocarbonation liquor which contained 10% by weight of sodium hydroxide, 7.1% by weight of carbon disulfide and 0.31% by weight of Triton X-155. The bottom of the bag was introduced into the nip of a hand-operated, home-laundry type, clothes wringer, and the bag was passed through the wringer 12 times in each direction during a 90 second period in order to work the reagents into the 5-ply of fabric. Post-thiocarbonation washing was carried out as in Examples 7, 8 and 9, except that the number of washes was increased by one for a total of five. The pieces of cotton muslin were then metathesized in a manner similar to that employed with Examples 1 and 2, except that the time of agitation was reduced to a two-minute period. After the metathesis step was completed, the pieces of cotton muslin were then washed in a manner similar to that employed with Examples 7, 8 and 9. One of the cotton muslin pieces, which originally weighed 5.14 grams, was then graft copolymerized in accordance with the procedure described in Examples 1 and 2, using a catalyst-monomer mixture which consisted of 20 grams of ethyl hexyl maleate, 4.4 grams of water, 0.45 gram of Atlas HLB No. 4, 0.15 gram of Triton GR-5, and 1.0 gram of 18.75% $H_2O_2$. After a 90-second exposure to the microwave energy the sample exhibited an add-on of 10.8%.

EXAMPLES 11 and 12

Two separate samples of cotton LaCoste knit, weighing 2.49 grams and 2.53 grams respectively, were grafted in accordance with the procedure used with the disks of LaCoste knit in Example 3, the only exceptions being that the thiocarbonation liquor employed with the second sample was an aqueous solution containing 10% by weight of sodium hydroxide, 7.1% by weight carbon disulfide, 0.156% by weight of Triton X-155 and 1.5% by weight of Eisen-Weinsaure-Natrium (as a swelling agent); and that the monomer-catalyst mixture used with both samples consisted of an aqueous solution containing 4.0 grams of methyl methacrylate, 4.0 grams of acrylic acid, 2.0 grams of water and 2.0 grams of 5% $H_2O_2$. The reaction time in each instance was 45 seconds in the microwave oven. In the case of the first sample the add-on was 32.6%, and in the case of the second sample the add-on was 33.6%.

EXAMPLE 13

A sample of cotton staple fiber weighing 10.0 grams was processed in a manner similar to that employed with Examples 1 and 2, except that the monomer-catalyst mixture consisted of 12.5 grams of acrylamide, 12.5 grams of water and 10.0 grams of 1.25% $H_2O_2$. After a 60-second exposure to microwave energy, the sample exhibited an add-on of 55.5%.

EXAMPLE 14

A sample of cotton staple fiber weighing 3.33 grams was thiocarbonated in a manner similar to that employed in Example 3, and then washed by flooding the sample while it was on the Buchner funnel and still under vacuum with 500 ml. of 50° C distilled water which had previously been adjusted to a pH of 4.0 with formic acid. Complete drainage occurred in 30 seconds. The sample was then inverted and a second 500 ml. wash was applied. This procedure was repeated for a total of five times. The sample was then metathesized in accordance with the procedure set forth in Example 3, and then washed in accordance with the procedure set forth for post-metathesis washing in Examples 7, 8 and 9. The graft-copolymerization procedure was the same as that employed in Examples 1 and 2, except that the monomer-catalyst mixture consisted of 8.28 grams of acrylamide, 11.72 grams of N-methylolacrylamide, 5 grams of water and 1.0 gram of 18.75% $H_2O_2$. After a 90-second exposure to microwave energy, the sample exhibited an add-on of 129%.

EXAMPLE 15

A piece of rayon twill fabric weighing 1.55 grams was thiocarbonated as in Example 3, and then washed on the Buchner funnel by flooding with 500 ml. of distilled water having a temperature of 25° C and a pH of 6.0. A low vacuum was maintained on the funnel so that the drainage rate was approximately 500 ml. per minute. This wash was repeated with another 500 ml. of such water, and any excess wash water was removed by suction. The sample was then metathesized in a manner similar to that employed in Example 3, and then washed in the same manner as that employed in Examples 7, 8 and 9. The sample was graft-copolymerized in a manner similar to that employed in Examples 1 and 2, except that the monomer-catalyst mixture consisted of 20 grams of methyl methacrylate, 5 grams of water and 1 gram of 18.75% $H_2O_2$. After a 90-second exposure to microwave energy, the sample exhibited an add-on of 29.3%.

EXAMPLES 16 and 17

Two separate samples consisting of pieces of wooden tongue depressors, weighing 3.27 grams and 3.35 grams respectively, were placed in separate polyethylene bags such as those employed in the grafting step in Examples 1 and 2, each bag containing an aqueous thiocarbonation liquor consisting of 10% by weight of sodium hydroxide, 7.1% by weight of carbon disulfide, 0.156% by weight of Triton X-155 and 82.744% by weight of distilled water. The bottom of each bag was inserted in the nip of a hand-operated, home-laundry type of clothes wringer which was mounted horizontally so that the bags could be kept in an upright position. Each of the bags was passed through the nip until the substrate inside had passed through the wringer and then the wringer was reversed. The bags were passed back and forth through the wringer at the rate of approximately five times per minute in order to work the thiocarbonation liquor into the substrate. On the last pass, the excess liquor was squeezed out of the tops of the bags; and, after a two-minute period, each of the substrates was immersed in water to quench the thiocarbonation reaction. Each of the samples was then washed five times in 200 ml. portions of distilled water having a temperature of 50° C and its pH adjusted to 4.0 with acetic acid. Each of the washes was conducted by inserting the sample and the 200 ml. of wash water in separate one-liter, widemouth, screw-cap polyethylene bottles and then agitating the capped bottles at 120 cycles per minute for a two-minute period. Each of the washed substrates were then inserted into separate one-liter, widemouth, screw-cap polyethylene bottles which were filled with a metathesizing solution containing 0.004% by weight of Mohr's salt and 0.05% by weight of tetrakis-hydroxymethylphosphonium chloride. After capping, the bottles were agitated at 120 cycles per minute for two minutes, and then drained. The post-metathesis washing consisted of three washes of each sample in a manner similar to that employed in the post-thiocarbonation washings. Graft-copolymerization of the samples was conducted in a manner similar to that employed in Examples 1 and 2. The monomer-catalyst mixture employed with one of the samples consisted of 20 grams of methyl methacrylate, 0.375 gram of Atlas HLB No. 4, 0.125 gram of Triton GR-5, 5 grams of water and 1.0 gram of 18.75% $H_2O_2$, and the monomer-catalyst mixture employed with the other sample consisted of 4.1 grams of acrylamide, 5.9 grams of N-methylolacrylamide, 0.125 gram of Triton GR-5, 0.375 gram of Atlas HLB No. 4, 12.5 grams of dimethylsulfoxide, 2.5 grams of water, and 1.0 gram of 18.75% $H_2O_2$. After a 90-second exposure to the microwave energy, the first sample exhibited an add-on of 9.2% and the second sample exhibited an add-on of 13.5%.

EXAMPLE 18

Wooden tongue depressors weighing 3.20 grams were thiocarbonated in a manner similar to that employed in Examples 16 and 17, washed in a manner similar to that employed in Example 3, and metathesized in a manner similar to that employed in Examples 16 and 17, except that the Mohr's Salt concentration was increased to 0.04% by weight of the metathesizing solution. The graft-copolymerization procedure was the same as that used in Examples 16 and 17, except that the monomer-catalyst mixture employed consisted of 12.5 grams of styrene, 12.5 grams of dimethylsulfoxide, 0.375 gram of Atlas HLB No. 4, 0.125 gram of Triton GR-5, and 1.0 gram of 18.75% of $H_2O_2$. After a 45-second exposure to the microwave energy the sample exhibited an add-on of 29.0%. A portion of the grafted wood sample having a fuzzy, roughened surface was subsequently compressed in a heated Carver press to give a hard, smooth, molded surface.

EXAMPLES 19 and 20

A sample of a woven jute fabric weighing 4.14 grams and a sample of a disk of Whatman No. 31 filter paper weighing 1.16 grams were separately grafted in a manner similar to that employed in Example 3, using monomer-catalyst mixtures which consisted of 3.28 grams of acrylamide, 4.69 grams of N-methylolacrylamide, 2.0 grams of water, and 1.0 gram of 18.75% $H_2O_2$. After a 45-second exposure to the microwave energy, the jute exhibited an add-on of 96.0% and the paper exhibited an add-on of 137.2%.

EXAMPLES 21 to 26

Small disks of cellophane weighing 0.70 gram each were placed in a large sintered glass funnel and soaked for 10 minutes at a temperature of from 25° to 30° C in 250 grams of an aqueous mixture containing 10.0% by weight of sodium metasilicate, 7.1% by weight of carbon disulfide and 0.314% by weight of Triton X-155. The thiocarbonation liquor was removed and four 500 ml. portions of water at 50° C were used to wash the samples in the funnel. The samples were then metathesized by soaking them in the funnel for five minutes at a temperature of 25° to 30° C in an aqueous solution containing 0.004% by weight of Mohr's Salt and 0.05% by weight of tetrakis-hydroxymethylphosphonium chloride. Post-metathesis washing was accomplished using three 500 ml. portions of distilled water at 25° to 30° C. Each of the samples was then placed in a separate polyethylene bag containing 6.0 ml. of a monomer-catalyst mixture in accordance with the following table:

TABLE V

| Monomer-Catalyst Components | 21 | 22 | EXAMPLE NO. 23 | 24 | 25 | 26 |
|---|---|---|---|---|---|---|
| Methyl Methacrylate | 5 gr. | | | | | |
| Acrylic Acid | | 5.0 gr. | | | | |
| Maleic Anhydride | | | 5.0 gr. | | | |
| α-Methylstyrene | | | | 5.0 gr. | | |
| 3-Methyl-2-butenoic Acid | | | | | 5.0 gr. | |
| Vinyl Acetate | | | | | | 5.0 gr. |
| Atlas HLB No. 4 | 0.075 gr. | | | 0.075 gr. | | |
| Triton GR-5 | 0.025 gr. | | | 0.025 gr. | | |
| 0.25% $H_2O_2$ | 1.0 gr. | 1.0 gr. | 1.0 gr. | 1.0 gr. | 1.0 gr. | 1.0 gr. |
| % Add-on | 14.5 | 15.6 | 11.5 | 15.6 | 15.6 | 11.5 |

The polyethylene bags containing the samples and the appropriate monomer-catalyst mixture were handled in a manner similar to that employed in Examples 1 and 2. The microwave exposure step in each instance consisted of two five-second exposure periods separated by a 60-second hold period. In each instance, the reaction was terminated by immersing the sample in a sodium bisulfite solution, and then the product was thoroughly washed before obtaining the dried yields. The % add-on in each instance is also set forth in the above table.

EXAMPLES 27, 28 and 29

Three separate 10 gram samples of potato starch were each placed in its own Buchner funnel with a sheet of Whatman No. 30 filter paper at the bottom, and then each of the samples was slurried for two minutes in its respective funnel and at 25° C with 100 grams of an aqueous thiocarbonation liquor which contained 1.0% by weight of sodium metasilicate, 1.0% by weight of carbon disulfide and 0.044% by weight of Triton X-155. The thiocarbonation liquors were filtered off, and then each of the samples was washed with five 200 ml. portions of water having a temperature of 50° C. Metathesis was conducted in the same funnels for a two-minute period and at a temperature of 25° C with 100 ml. solutions containing 0.04% by weight of Mohr's Salt and 0.05% by weight of tetrakis-hydroxymethylphosphonium chloride. The metathesizing liquors were filtered off, and then each of the samples was washed with three 200 ml. portions of water having a temperature of 25° C. Each of the wet starch samples was transferred to its own polyethylene bag, to which was added the following monomer catalyst mixtures:

TABLE VI

| Monomer-Catalyst Components | Example 27 | Example 28 | Example 29 |
|---|---|---|---|
| Methyl Methacrylate | 20.0 grams | | |
| Acrylamide | | 8.3 grams | |
| N-Methylolacrylamide | | 11.7 grams | |
| Styrene | | | 8.0 grams |
| Methacrylonitrile | | | 12.0 grams |
| Atlas HLB No. 4 | 0.375 gram | | 0.375 gram |
| Triton GR-5 | 0.123 gram | | 0.133 gram |
| Water | 5.0 grams | 5.0 grams | |
| 18.75% $H_2O_2$ | 1.0 gram | 1.0 gram | 1.0 gram |
| % Add-on | 43.9 | 70.5 | 102.3 |

The polyethylene bags containing the starch samples were each exposed to 45 seconds of microwave energy, and the add-on obtained with each of the resulting products is also set forth in the above table.

EXAMPLE 30

A 30.0 gram sample of rice starch was suspended in a 200 ml. beaker with 100 ml. of a freshly prepared emulsion containing 1.0% by weight of sodium metasilicate, 2.3% by weight of carbon disulfide and 0.1% by weight of Triton X-155. This mixture was allowed to stand for 30 minutes at 25° C, and was then transferred to a Büchner funnel to filter off the excess thiocarbonation liquor. The resulting filtercake was washed with a single 100 ml. portion of water, followed by 30 ml. of 2% acetic acid. The cake was then transferred to a small beaker and pasted with 25 ml. of an aqueous solution containing 0.01% by weight of Mohr's Salt for a five-minute period and at a temperature of 25° C. This paste was also transferred to a Büchner funnel, filtered, and then washed with 50 ml. of water having a temperature of 25° C. One-fifth of the resulting filter cake, which was equivalent to a 6.0 gram portion of the initial sample, was pasted with a monomer-catalyst mixture which consisted of 10.0 grams of methyl methacrylate, 0.2 gram of Atlas HLB No. 7 (a non-ionic surfactant manufactured and sold by Atlas Chemical Industries of Wilmington, Delaware), 9.7 grams of water, and 0.114 grams of $H_2O_2$. The resulting paste was spread out in a four inch Petrie culture dish; and, with the cover in place, was exposed to the microwave energy field for a five-second period. After being allowed to sit for a 30-second period, the sample was then given a second 5-second microwave exposure. After washing the resulting product exhibited on add-on of 59.0%.

EXAMPLES 31–34

A skein of 600 denier "Bright Estron" cellulose acetate yarn weighing 146.0 grams was thiocarbonated for a 10 minute period at 25° C in a large beaker containing 1,000 ml. of an aqueous solution consisting of 4.0% by weight of sodium metasilicate, 0.8% by weight of carbon disulfide, 0.035% by weight of Triton X-155 and 95.2% by weight of water. The sample as then washed in large beakers with four 1,000 ml. portions of water at 40° C, each wash lasting for a two-minute period. The sample was subsequently metathesized for a two-minute period in another large beaker containing 1,000 ml. of an aqueous solution containing 0.004% by weight of Mohr's Salt, and then washed again with two 1,000 ml. portions of 25° C water, each washing also being for a two-minute period. The sample was divided into five equal parts, each portion representing 29.2 grams of the original sample, and each portion was inserted into its own polyethylene bag with 20 grams of a monomer-catalyst mixture in accordance with the following table:

TABLE VII

| Monomer-Catalyst Components | Example 31 | Example 32 | Example 33 | Example 34 |
| --- | --- | --- | --- | --- |
| Methyl Methacrylate | 10 grams | 4 grams | | |
| Acrylic Acid | | 12 grams | | 12.8 grams |
| Acrylamide | | | 5 grams | |
| N-Methylolacrylamide | | | 5 grams | |
| Styrene | | | | 3.2 grams |
| Atlas HLB No. 7 | 0.2 gram | | | |
| Water | 9.8 grams | 4 grams | 10 grams | 4 grams |
| $H_2O_2$ | 0.114 gram | 0.114 gram | 0.114 gram | 0.114 gram |
| % Add-on | 5.5 | 16.5 | 22.8 | 28.2 |

The monomer-catalyst mixture was padded into each of the substrates in a manner similar to that employed in Examples 1 and 2, and then each of the samples was exposed to two 5-second exposures to the microwave energy, the exposures being separated by a 30-second holding period. The reactions were quenched by immersing the samples in a dilute sodium hydrosulfite solution, followed by washing; and the samples were dried before calculating the yield. The add-on in each instance is also provided in the table above.

EXAMPLES 35–38

Four separate samples of scoured wool tops weighing 10 grams, 10 grams, 8.4 grams and 10 grams respectively, were thioated in Buchner funnels for a five minute period and at a temperature of 25° C in a manner similar to that employed in Example 3, using in each instance 500 grams of a solution which contained 2.4% by weight of sodium silicate, 1.44% by weight of carbon disulfide, and 0.44% by weight of Triton X-155. Each of the samples was then washed with five consecutive washes of two minutes each, using 200 ml. portions of 50° C water which had its pH adjusted to 4.0 for each wash and also using the post-thiocarbonation washing procedure described in Example 3. Each of the samples were then metathesized and washed again in a manner similar to that employed in Example 5. The samples were placed in separate polyethylene bags which contained monomer-catalyst mixtures in accordance with the following table:

TABLE VIII

| Monomer-Catalyst Components | Example 35 | Example 36 | Example 37 | Example 38 |
| --- | --- | --- | --- | --- |
| Methacrylic Acid | 6 grams | | | |
| Acrylic Acid | 6 grams | | | |
| Acrylamide | | 4.46 grams | | |
| N-Methylolacrylamide | | 6.34 grams | | |
| Methacrylonitrile | | | 12 grams | |
| Methyl Methacrylate | | | | 12 grams |
| Atlas HLB No. 4 | | | 0.15 gram | 0.15 gram |
| Triton GR-5 | | | 0.15 gram | 0.15 gram |
| 0.25% $H_2O_2$ | 3 ml. | 3 ml. | 3 ml. | 3 ml. |
| % Add-on | 15.9 | 50.0 | 12.8 | 11.1 |

Each of the samples was exposed for 45 seconds to microwave energy to yield products having the add-ons set forth in the table above.

EXAMPLES 39 and 40

Two samples of human hair, each weighing 3.0 grams, were thioated for a two-minute period and at a temperature of 25° C in 200 ml. of an aqueous solution which contained 2.0% by weight of sodium metasilicate, 1.0% by weight of carbon disulfide and 0.044% by weight of Triton X-155, using a procedure similar to that set forth in Examples 1 and 2. The samples were then washed five times with 200 ml. portions of water having a temperature of 50° C and an adjusted pH of 4.0, each washing being for a two-minute period and being carried out in a manner similar to that set forth in Example 16. The samples were metathesized for two minutes at 25° C with 200 ml. of a solution containing 0.004% by weight of Mohr's Salt and 0.05% by weight of tetrakis-hydroxymethylphosphonium chloride, using a technique similar to that set forth in Examples 1 and 2. Post metathesis washing consisted of three 200 ml. washes with 25° C distilled water. The samples were then placed in separate polyethylene bags which contained monomer-catalyst mixtures in accordance with the following table:

TABLE IX

| Monomer-Catalyst Components | Example 39 | Example 40 |
|---|---|---|
| Methyl Methacrylate | 6 grams | |
| Acrylic Acid | 6 grams | |
| Acrylamide | | 4.4 grams |
| N-Methylolacrylamide | | 6.3 grams |
| Water | ≈3 ml. | ≈4 ml. |
| 5% $H_2O_2$ | 2 ml. | 2 ml. |
| % Add-on | 19.3 | 51.0 |

Each of the samples was exposed for a 45-second period to the microwave energy to provide products having the add-ons indicated in the above table.

EXAMPLES 41–43

Three disks of silk fabric weighing 0.66 grams, 0.62 grams and 0.64 grams respectively, were separately thioated, washed, metathesized and washed again in a manner similar to that described in Example 3. The samples were then placed in separate polyethylene bags containing monomer-catalyst mixtures in accordance with the following table:

TABLE X

| Monomer-Catalyst Components | Example 41 | Example 42 | Example 43 |
|---|---|---|---|
| Styrene | 4.8 grams | | |
| Methacrylonitrile | 7.2 grams | | |
| Methyl Methacrylate | | 6.0 grams | |
| Acrylic Acid | | 6.0 grams | |
| Acrylamide | | | 4.72 grams |
| N-Methylolacrylamide | | | 7.08 grams |
| Atlas HLB No. 4 | 0.225 gram | | |
| Triton GR-5 | 0.075 gram | | |
| Water | 2.7 grams | 3.0 grams | 3.0 grams |
| $H_2O_2$ | 0.015 gram | 0.015 gram | 0.015 gram |
| % Add-on | 35.0 | 198.8 | 299% |

The graft-copolymerization reaction was conducted in a manner similar to that set forth in Examples 1 and 2, except that the exposure to microwave energy was for a 60-second period for each sample. The add-on for the resulting products is provided in the above table.

EXAMPLE 44

A 10.0 gram sample of 15 denier, Type 100, Nylon 66 was thioated for 60 minutes at a temperature of 25° to 30° C in 500 ml. of an emulsion consisting of 30 grams of sodium hydroxide, 30 grams of carbon disulfide, 10 grams of benzyl alcohol and 1.315 grams of Triton X-155, using the procedure described in Examples 1 and 2. The thioated sample as then washed with six 1,000 ml. portions of water having a temperature of 50° C and its pH adjusted to 5.0, each wash being for a two-minute period and being conducted in a manner similar to that described in Examples 7, 8 and 9. After the post-thioation washes were completed, the sample was metathesized in a manner similar to that described in Examples 1 and 2, and then the metathesized sample was washed with four 1,000 ml. portions of 25° C water in a manner similar to that employed in the post-thioation washes. After the post-metathesis washes were complete, the sample was then graft-copolymerized in a manner similar to that described in Examples 1 and 2, using a monomer-catalyst mixture which consisted of 6.38 grams of acrylamide, 8.62 grams of water and 10.0 grams of 1.25% $H_2O_2$. After a 60-second exposure to the microwave energy, the sample exhibited an add-on of 31.2%.

EXAMPLE 45

A sample of Nylon 66 tricot fabric weighing 2.35 grams was prepared and grafted in a manner which was identical to that employed in Example 44, the only exception being that the acrylamide in the monomer-catalyst mixture was reduced from 6.38 grams to 0.84 gram. The resulting product exhibited an add-on of 6.3%.

EXAMPLES 46, 47 and 48

A 10.0 gram sample of Nylon 66 staple was thioated, washed, metathesized and washed in a manner similar to that described in Example 10. The thioated and metathesized sample was then divided into three equal portions, and each portion was then graft copolymerized for a 90-second period in a manner similar to that described in Examples 1 and 2. The particular monomer-catalyst system used with each of the portions, along with the add-on achieved, is set forth in the following table:

TABLE XI

| Monomer-Catalyst Components | Example 46 | Example 47 | Example 48 |
|---|---|---|---|
| Styrene | 4.8 grams | | |
| Methacrylonitrile | 7.2 grams | | |
| Methyl Methacrylate | | 12.0 grams | |
| Acrylamide | | | 4.72 grams |
| N-Methylolacrylamide | | | 7.08 grams |
| Atlas HLB No. 4 | 0.225 gram | 0.225 gram | 0.225 gram |
| Triton GR-5 | 0.075 gram | 0.075 gram | 0.075 gram |
| Water | 12.7 grams | 12.7 grams | 12.7 grams |
| 18.75% $H_2O_2$ | 1.0 gram | 1.0 gram | 1.0 gram |
| % Add-on | 39.8 | 56.6 | 115.0 |

EXAMPLES 49 and 50

Two nylon yarn samples which were knitted into tubing form and which weighed 5.10 grams each were thioated, washed, metathesized, washed and polymerized in a manner similar to that described in Example 44. After an 18-second period of exposure to the microwave energy the first sample exhibited an add-on of 31.8%, and the second sample exhibited an add-on of 73.2%. The monomer-catalyst mixtures employed with each of the samples are set forth in the following table:

TABLE XII

| Monomer-Catalyst Components | Example 49 | Example 50 |
|---|---|---|
| Methacrylic Acid | 7.07 grams | |
| Acrylamide | | 7.62 grams |

TABLE XII-continued

| Monomer-Catalyst Components | Example 49 | Example 50 |
|---|---|---|
| Tween-85* | 1.0 gram | |
| Water | 17.0 grams | 17.0 grams |
| 1% $H_2O_2$ | 1.3 grams | 1.3 grams |

*A non-ionic surfactant manufactured and sold by Atlas Chemical Industries of Wilmington, Delaware.

EXAMPLES 51–54

Woven nylon fabric weighing 6.7 ounces per square yard was cut into tared pieces and then prepared for graft-copolymerization in a manner similar to that set forth in Example 44. Each of the samples was then polymerized for a 60-second period in a manner similar to that set forth in Examples 1 and 2. The initial weight of the samples, the monomer-catalyst mixtures employed and the add-ons observed with each of the samples are set forth in the following table:

TABLE XIII

| Monomer-Catalyst Components | Example 51 | Example 52 | Example 53 | Example 54 |
|---|---|---|---|---|
| Methyl Methacrylate | 7.12 grams | | | |
| Acrylamide | | 0.8 gram | | |
| Methacrylic Acid | | | 0.70 gram | 5.20 grams |
| N-Methylolacrylamide | | 1.2 grams | | |
| N,N-Dimethylaminoethyl Methacrylate | | | 1.3 grams | |
| Arquad 16-50* | 0.35 gram | | | |
| 18.75% $H_2O_2$ | 1.0 gram | 1.0 gram | 1.0 gram | 1.0 gram |
| Water | 17.0 grams | 22.0 grams | 22.0 grams | 19.0 grams |
| Initial Weight of Sample | 5.11 grams | 5.26 grams | 5.18 grams | 5.03 grams |
| % Add-on | 5.0 | 54.5 | 16.0 | 40.4 |

*A cationic surfactant manufactured by the Armour Chemical Company.

EXAMPLE 55

Nylon 6 carpet yarn was tufted into a polypropylene backing and no adhesives were added. A sample approximately nine inches square and weighing 40.0 grams was cut from this tufted material and was thioated for five minutes at 25° C in a manner similar to that described in Example 10, using 150 grams of an emulsion containing 15 grams of sodium hydroxide, 15.0 grams of carbon disulfide and 0.66 gram of Triton X-155. The sample was then washed with four 1,000 ml. portions of water having a temperature of 50° C and its pH adjusted to 4.0. Each wash was conducted for a two-minute period and in a manner similar to that set forth in Examples 1 and 2. After the post-thioation washes were completed, the sample was metathesized in a manner similar to that set forth in Examples 1 and 2, and then washed again with three 1,000 ml. portions of 25° C water in a manner similar to the post-thioation washes. The sample was then graft-copolymerized in a manner similar to that set forth in Examples 1 and 2, using a monomer-catalyst mixture which consisted of 5.94 grams of acrylamide, 8.46 grams of N-methylolacrylamide, 5.6 grams of water, and 4.0 grams of 0.25% $H_2O_2$. After a 120-second exposure to the microwave energy, the resulting product which exhibited enhanced dye receptivity had an add-on of 18.8%.

EXAMPLE 56

A cotton print cloth was thiocarbonated and metathesized in a manner similar to that set forth in Example 10. A printing paste which was made up by mixing 5 grams of a monomer-catalyst mixture consisting of 17.7 grams of methacrylic acid, 2.3 grams of N,N-dimethylaminoethyl methacrylate and 1.0 gram of 10% $H_2O_2$, with 3.0 grams of a Disperse Blue dyestuff (Color Index No. 41) in a mortar and pestle was then pasted onto the thiocarbonated metathesized print cloth through an acetate stencil. After a 60-second exposure to the microwave energy, the resulting product was washed with soap to remove any loose material. The pattern on the resulting product was sharp and crisp in appearance and exhibited good wash-fastness.

EXAMPLE 57

A single-point spinnerette nozzle which was capable of producing approximately 2500 denier (15 denier per filament) was employed to produce a viscose yarn at a rate of approximately 30 meters per minute. The yarn was partially regenerated, washed with water, and then washed with a solution of Mohr's salt containing approximately 1 part per million of iron. The metathesis wash with Mohr's salt was then followed with another aqueous wash. Although all of these steps were performed continuously as part of the spinning operation, samples of the rayon which were taken at this point in the spinning operation exhibited residual gamma values of from about 4 to about 8. Any excess water was then mechanically removed from the washed yarn prior to its entry into a padding nip, which was continuously supplied by metering pumps with a well-mixed monomer-catalyst mixture. The monomer portion of the monomer-catalyst mixture consisted of 25% by weight of acrylamide, 25% by weight of acrylic acid and 50% by weight of water, and was supplied to the mixture at the rate of 10.5 cc per minute. The catalyst portion consisted of a 10% aqueous solution of $H_2O_2$, and was supplied at the rate of 4.25 cc per minute. The yarn, saturated with monomer-catalyst mixture, was then passed through a 1.0 Kw, 2450 MHz microwave energy field having a residence time of approximately 4 seconds. Upon emergence from the microwave applicator, the yarn was passed through an aqueous solution containing 0.5% by weight of sodium bisulfite to destroy any residual peroxide. Product was collected for a 53 minute period and washed by conventional techniques used in the rayon spinning process to produce a yarn of approximately 3600 denier, representing an add-on of 43% with respect to the product obtained.

EXAMPLE 58

A small tow (approximately 16,000 denier) made up of 3.78 denier viscose filaments was spun and partially regenerated to a residual gamma value of from about 4 to about 8. The tow was then chopped to a 3⅛ inch length, washed, and laid down as a blanket or batt on a moving screen. The resulting batt, while moving at approximately 1 yarn per minute, was saturated with an aqueous solution of Mohr's salt containing approximately 1 part per million of iron, and then washed. The excess wash water was removed from the batt by conventional means, and then the batt was saturated with a monomer-catalyst mixture, which consisted of 90% by weight of acrylic acid, 3% by weight of $H_2O_2$ and 7% by weight of water. The saturated batt supported on a belt which was transparent to microwave energy, was then passed through a 2.3 Kw, 2,450 MHz microwave applicator for a residence time of 21 seconds. After destroying any residual or excess peroxide through the use of an aqueous solution of 5% sodium bisulfite, the batt was washed with hot water to yield a product having a neutralization equivalent of 4.73 milli-equivalents per gram, which is equivalent to an add-on of acrylic acid of 51.7%.

EXAMPLE 59

A piece of cotton muslin fabric, approximately 24 yards long by 6¾ inches wide and weighing 242.7 grams was wound onto a dyetex tube to serve as a small beam. The wound beam was then placed in a small package-dyeing unit (three liter capacity) to activate the substrate for use in the subsequent graft-copolymerization reaction. The fabric was thiocarbonated by pumping an emulsion comprising 24 grams of sodium hydroxide, 2,140 grams of water, 34.2 grams of carbon disulfide and 1.5 grams of Triton X-155 through the package-dyeing unit at the rate of 840 cc per minute and at a temperature of from 24° C to 26° C for a 20 minute period. The thiocarbonation liquor was then drained from the system, and the thiocarbonated substrate was washed with eight consecutive 2500 cc-portions of water, each portion being pumped through the package-dyeing unit at the rate of approximately 1,400 cc per minute for a nine-minute period. This washing procedure was then followed with a metathesis step wherein an aqueous solution containing 2200 cc of water, 0.12 grams of Mohr's salt and 0.12 grams of stannic chloride pentahydrate was pumped through the package-dyeing unit at a rate of 840 cc per minute and at a temperature of 24° to 26° C for a 12-minute period. The metathesized substrate was then washed with two consecutive washes similar to those used after the thiocarbonation step, each wash being for a nine-minute period. The wound beam was removed from the package-dyeing unit and centrifugally extracted to remove any excess wash-water. The fabric was then unwound from the beam and passed at the rate of five feet per minute through a flooded-nip, padding bath which was supplied by metering pumps at a rate of approximately 45 cc per minute with a monomer-catalyst mixture which contained 23.1% by weight of acrylic acid, 46.2% by weight of acrylamide, 0.1% by weight of Triton X-301 (a sodium alkylaryl polyether sulfate surfactant manufactured and sold by Rohm and Haas Company of Philadelphia, Pennsylvania), 26.6% by weight of water, and 4.0% by weight of an aqueous solution containing 35% of $H_2O_2$. The substrate, while it was saturated with the monomer-catalyst mixture, was then passed through a 1.5 Kw, 2,450 MHz microwave applicator field, the maximum residence time in the micro-wave energy being a period of less than ten seconds. After extraction with hot-water, the resulting grafted product exhibited an add-on of 76.5%.

What is claimed is:

1. A process for simultaneously printing and grafting a water-insoluble, thioated fabric which comprises:
   A. applying to said fabric a printing paste comprising:
      1. at least one ethylenically unsaturated monomer,
      2. a peroxidic free-radical initiator, and
      3. a pigment or a dyestuff; and
   B. subjecting the pasted fabric to microwave energy having a frequency of about 900 Mega Hertz or greater.

2. The printed product obtained by way of the process claimed in claim 1.

* * * * *